(12) United States Patent
Ikeda

(10) Patent No.: US 8,610,678 B2
(45) Date of Patent: Dec. 17, 2013

(54) INFORMATION PROCESSING APPARATUS AND METHOD FOR MOVING A DISPLAYED OBJECT BETWEEN MULTIPLE DISPLAYS

(75) Inventor: Tetsuo Ikeda, Tokyo (JP)

(73) Assignee: Sony Corporation, Tokyo (JP)

( * ) Notice: Subject to any disclaimer, the term of this patent is extended or adjusted under 35 U.S.C. 154(b) by 738 days.

(21) Appl. No.: 12/691,598

(22) Filed: Jan. 21, 2010

(65) Prior Publication Data

US 2010/0188352 A1 Jul. 29, 2010

(30) Foreign Application Priority Data

Jan. 28, 2009 (JP) ................. P2009-017204

(51) Int. Cl.
*G06F 3/041* (2006.01)
*G06F 3/048* (2013.01)
*G09G 5/00* (2006.01)

(52) U.S. Cl.
USPC ............. 345/173; 345/1.1; 345/1.2; 715/769

(58) Field of Classification Search
USPC ................................... 345/173–178
See application file for complete search history.

(56) References Cited

U.S. PATENT DOCUMENTS

| 6,545,669 | B1* | 4/2003 | Kinawi et al. ................. | 345/173 |
| 2005/0270278 | A1* | 12/2005 | Ouchi ........................... | 345/173 |
| 2007/0146347 | A1* | 6/2007 | Rosenberg ..................... | 345/173 |
| 2008/0068346 | A1* | 3/2008 | Naganawa ..................... | 345/173 |
| 2009/0164930 | A1* | 6/2009 | Chen et al. .................... | 345/173 |

FOREIGN PATENT DOCUMENTS

| JP | 05-250129 | 9/1993 |
| JP | 06-44001 | 2/1994 |
| JP | 2001-092578 | 4/2001 |
| JP | 2005-278938 | 10/2005 |
| JP | 2006-251465 | 9/2006 |

OTHER PUBLICATIONS

May 7, 2013, EP Search Report issued for related EP Application No. 09252649.

* cited by examiner

*Primary Examiner* — Bipin Shalwala
*Assistant Examiner* — Ryan A Lubit
(74) *Attorney, Agent, or Firm* — Sherr & Jiang, PLLC

(57) ABSTRACT

There is provided an information processing apparatus including first and second display panels capable of displaying a plurality of objects and being connected with each other via a connection unit serving as a non-display region in which the objects are not displayed, an input position detection unit for detecting a position of an operator, a direction detection unit for detecting a moving direction of the operator, a moved position calculation unit for calculating a moved position to which an object selected with the operator moves, and a display position correction unit for moving the selected object from the non-display region, on the basis of a display position of the selected object or a moving direction of the operator, in a case where at least a portion of the selected object having moved to the calculated moved position resides in the non-display region.

8 Claims, 13 Drawing Sheets

A CASE WHERE OPERATION IS PERFORMED ON OBJECT LOCATED IN PROXIMITY TO NON-DISPLAY REGION

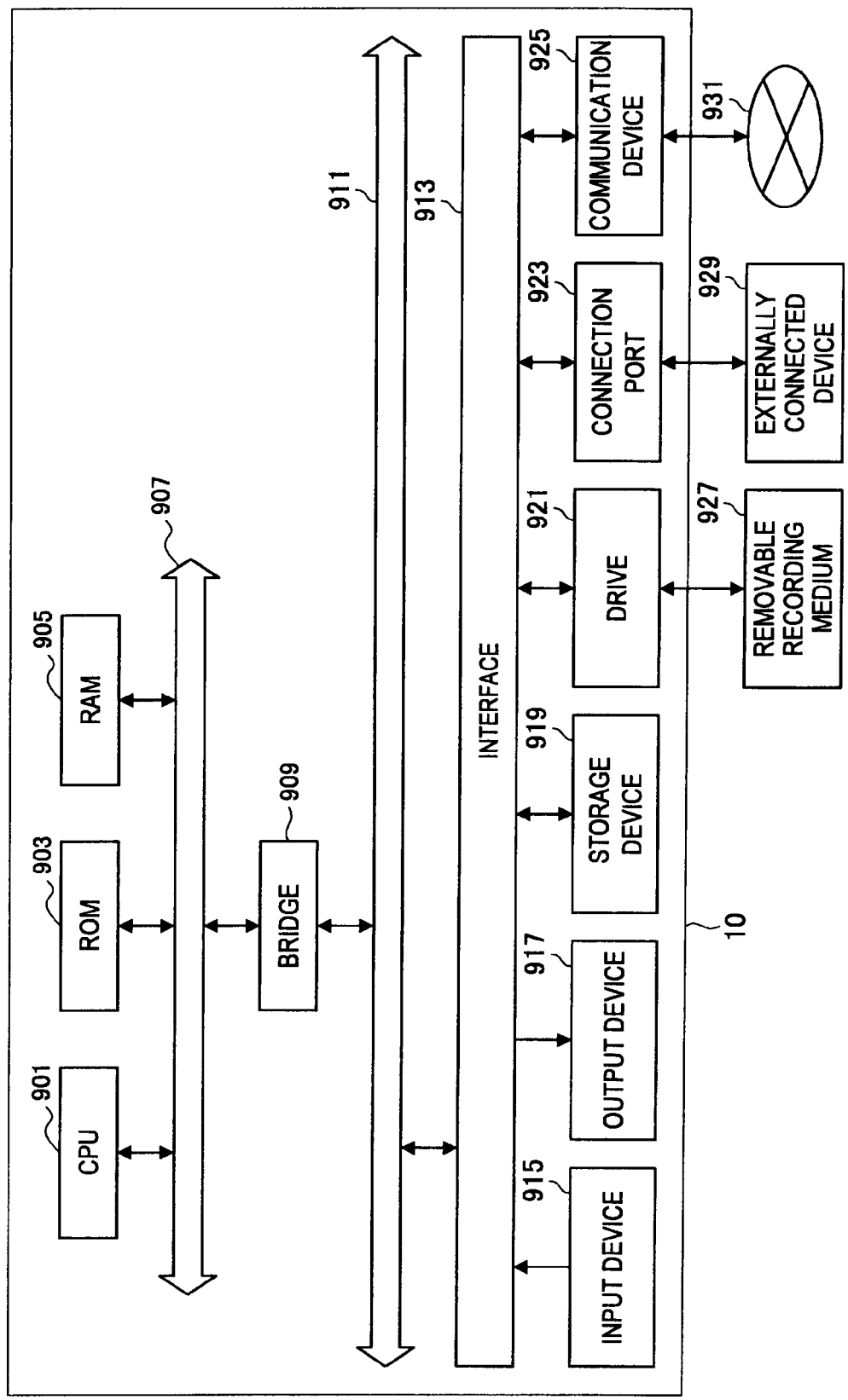

INFORMATION PROCESSING APPARATUS AND METHOD FOR MOVING A DISPLAYED OBJECT BETWEEN MULTIPLE DISPLAYS

BACKGROUND OF THE INVENTION

1. Field of the Invention

The present invention relates to an information processing apparatus, an information processing method, and a program.

2. Description of the Related Art

Recently, many of small electronic appliances and consumer transaction facilities are equipped with a touch panel for allowing a user to directly touch a display screen so as to operate an object displayed on the screen. The use of the touch panel provides an intuitive operability and has an advantage in that even a user unfamiliar with operating a keyboard, a keypad, and the like can easily operate the touch panel. Some electronic appliances allow a user to operate a touch panel so as to move a displayed object displayed on the screen and execute a predetermined processing upon this moving operation.

An electronic appliance having two foldable above-described display screens connected to each other can display more information on the two display screens than an electronic appliance having one display screen, thus improving the convenience for the user. However, in many cases, an object may not be displayed on a portion connecting the two display screens with each other. Therefore, in the foldable electronic appliance, it is important to cope with this kind of connection portion.

For example, in a technique disclosed in Japanese Patent Application Laid-Open No. 6-44001, when a displayed object is moved from one display screen to another display screen, the displayed object is moved across the screens in a case where a moving speed is equal to or more than a predetermined speed at the time when a moving instruction has been finished. Japanese Patent Application Laid-Open No. 2005-278938 discloses a program for treating two display screens including a connection portion therebetween as one virtual display screen.

SUMMARY OF THE INVENTION

However, in the technique described in Japanese Patent Application Laid-Open No. 6-44001, a user who wants to move an object spanning two screens needs to perform operation upon taking into consideration the moving speed at the time when the moving instruction has been finished, and therefore, this technique causes an issue in the operability of the apparatus. On the other hand, the program described in Japanese Patent Application Laid-Open No. 2005-278938 disregards a case where a portion of a displayed object resides in the connection portion between the two display screens placed as a result of a moving processing of the displayed object.

In view of the above issues and other issues associated with conventional methods and apparatuses, the present invention provides an information processing apparatus, an information processing method, and a program capable of easily moving a displayed object displayed on one display screen to another display screen without any special operation performed.

According to an embodiment of the present invention, there is provided an information processing apparatus including first and second display panels capable of displaying a plurality of objects, the first and second display panels being connected with each other via a connection unit serving as a non-display region in which the objects are not displayed, an input position detection unit for detecting a position of an operator located on the first and/or second display panels, a direction detection unit for detecting a moving direction of the operator, on the basis of a time change of the detected position of the operator, a moved position calculation unit for calculating a moved position to which an object selected with the operator moves, the selected object moving to the moved position along a path in which the operator moves, and a display position correction unit for moving the selected object from the non-display region, on the basis of a display position of the selected object or a moving direction of the operator, in a case where at least a portion of the selected object having moved to the calculated moved position resides in the non-display region.

According to the above configuration, the input position detection unit detects the position of the operator located on one of the first and second display panels, and the direction detection unit detects the moving direction of the operator, on the basis of the time change of the detected position of the operator. The moved position calculation unit calculates the moved position to which one of the objects selected with the operator moves, wherein the selected object moves to the moved position along the path in which the operator moves. The display position correction unit moves the selected object from the non-display region, on the basis of a display position of the selected object or the moving direction of the operator, in a case where at least a portion of the selected object having moved to the calculated moved position resides in the non-display region.

The display position correction unit may preferably move the selected object to one of the first and second display panels in which a barycenter of the selected object resides, on the basis of the position of the barycenter of the selected object.

The display position correction unit may move the selected object to one of the first and second display panels toward which the operator moves, in a case where the selected object is in proximity to the non-display region.

The display position correction unit may move the selected object to one of the first and second display panels toward which the operator moves, in a case where attribute information associated with the selected object changes when the selected object is moved from one of the first and second display panels to the other of the first and second display panels.

According to another embodiment of the present invention, there is provided an information processing method including the steps of detecting a position of an operator located on first and/or second display panels capable of displaying a plurality of objects, the first and second display panel being connected with each other via a connection unit serving as a non-display region in which the objects are not displayed, detecting a moving direction of the operator, on the basis of a time change of the detected position of the operator, calculating a moved position to which an object selected with the operator moves, the selected object moving to the moved position along a path in which the operator moves, and moving the selected object from the non-display region, on the basis of a display position of the selected object or a moving direction of the operator, in a case where at least a portion of the selected object having moved to the calculated moved position resides in the non-display region.

According to another embodiment of the present invention, there is provided a program for a computer having first and second display panels capable of displaying a plurality of objects, the first and second display panels being connected with each other via a connection unit serving as a non-display region in which the objects are not displayed, the program causing the computer to achieve, an input position detection function for detecting a position of an operator located on the first and/or second display panels, a direction detection unit for detecting a moving direction of the operator, on the basis of a time change of the detected position of the operator, a moved position calculation function for calculating a moved position to which an object selected with the operator moves, the selected object moving to the moved position along a path in which the operator moves, and a display position correction function for moving the selected object from the non-display region, on the basis of a display position of the selected object or a moving direction of the operator, in a case where at least a portion of the selected object having moved to the calculated moved position resides in the non-display region.

As hereinabove described, according to the present invention, when at least a portion of the moved object resides in the non-display region, the processing is performed to move the object from the non-display region, on the basis of the display position of the object or the moving direction of the operator. Therefore, a user can easily move a display object displayed on one of the display screens to the other of the display screens without performing any special operation.

BRIEF DESCRIPTION OF THE DRAWINGS

FIG. 12 is a block diagram for illustrating a hardware configuration of the information processing apparatus according to each embodiment of the present invention.

DETAILED DESCRIPTION OF THE EMBODIMENTS

Figure 1:
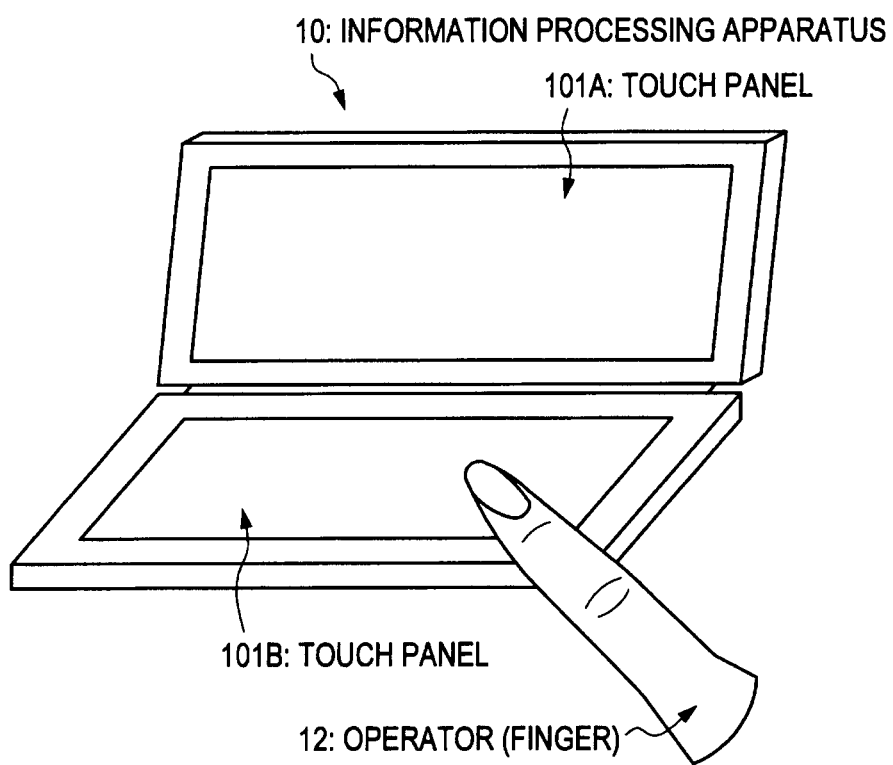
FIG. 1 is an explanatory diagram for illustrating an external appearance of an information processing apparatus according to the first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The explanation will be made in the following order.
(1) Purpose
(2) First embodiment
   (2-1) External appearance of information processing apparatus
   (2-2) Configuration of information processing apparatus
   (2-3) Regarding information processing method
(3) Hardware configuration of information processing apparatus according to each embodiment of the present invention
(4) Summary <Purpose>

Before explaining an information processing apparatus and an information processing method according to each embodiment of the present invention, issues that many occur in an electronic appliance having two display screens will be explained with reference to FIG. 13 so as to elucidate the present invention.

For example, a case is assumed where a user moves an object 503 such as an icon displayed on one of two display screens 501A and 501B of an electronic appliance by, e.g., drag operation, as shown in FIG. 13. At this occasion, depending on user's operation, a portion of the object 503 having been moved may possibly placed in a connection portion 505 located between the display screen 501A and the display screen 501B as shown in FIG. 13.

Figure 13A:
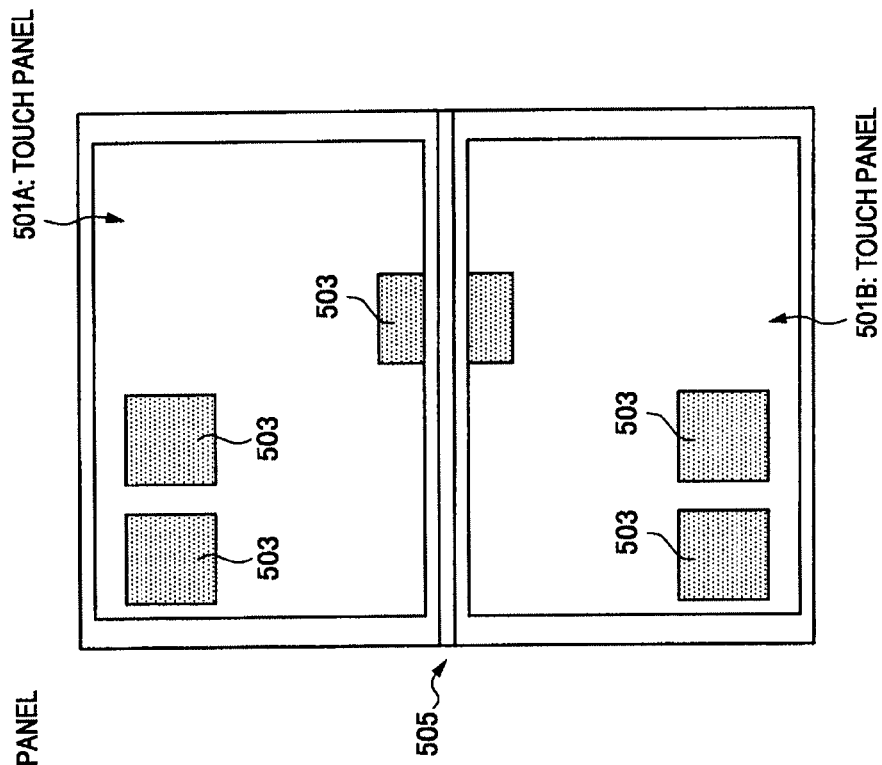
FIG. 13 is an explanatory diagram for illustrating a conventional information processing apparatus.

In a case where pixels are present in the connection portion 505, as shown in FIG. 13A, a portion of the object 503 resides in the connection portion 505, but the external housing of the connection portion 505 may not display the portion of the object 503. As a result, there is a difficulty for a user to understand the object 503.

Figure 13B:
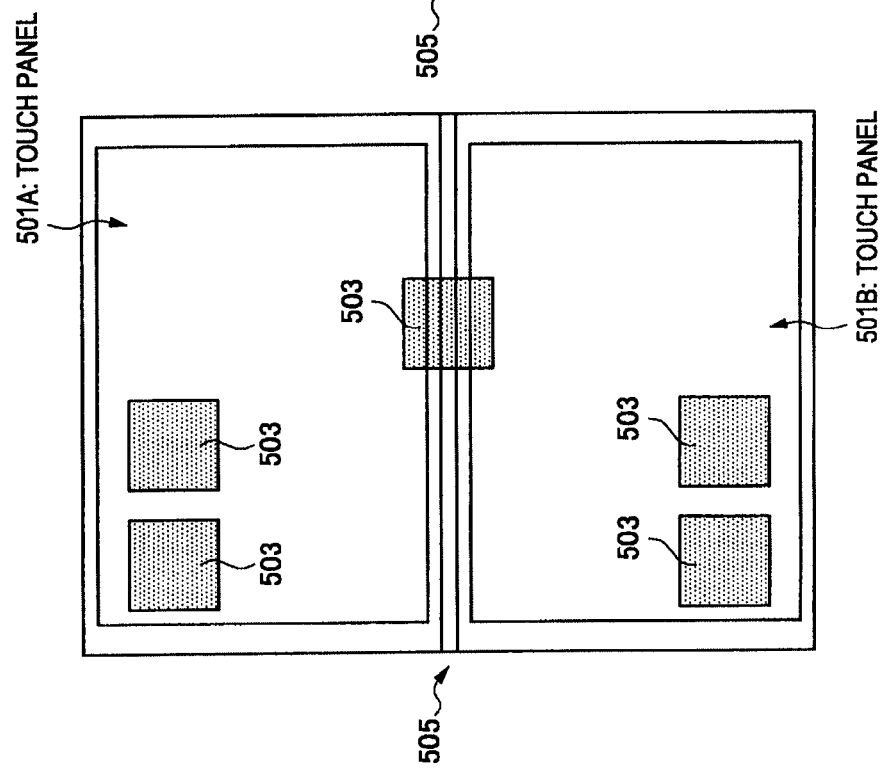

In a case where pixels are not present in the connection portion 505, as shown in FIG. 13B, the object 503 is displayed in such a manner that the object 503 is split in the middle. As a result, a user perceives the size of the object being different from what it actually is.

As described above, when a portion of the object resides in the connection portion in the electronic appliance having the two display screens connected via the connection portion that does not display any object, a user feels odd in the way the object appears compared with a case where the user sees the object in one screen. Therefore, when the moving processing of the object is executed across the screens, a technique is needed to avoid the object from being placed in the connection portion without requiring the user to perform any special operation.

Taking the above circumstances into consideration, the below-described embodiment of the present invention provides the information processing apparatus and the information processing method capable of easily moving a display object displayed on one display screen to another display screen without requiring any special operation to be performed.

(First Embodiment)
<External Appearance of Information Processing Apparatus>

First, the entire configuration of the information processing apparatus according to the first embodiment of the present invention will be described with reference to FIG. 1. FIG. 1 is an explanatory diagram for illustrating the external appearance of the information processing apparatus 10 according to the present embodiment.

As shown in FIG. 1, the information processing apparatus 10 has two display units having touch panels (hereinafter referred to as touch panels) 101A and 101B, and members arranged with respective touch panels are connected with each other so as to be foldable. Each of the touch panel 101A and 101B displays various kinds of information such as texts and images. Various kinds of information displayed on each of the touch panel 101A and 101B are subjected to predetermined processings such as scrolling in accordance with contact and movement of an operator 12. Further, the touch panel 101A and 101B may be arranged with a particular processing area. In this particular processing area, for example, an object such as an icon for executing a predetermined processing is displayed. When this particular processing area is selected, the predetermined processing associated with the displayed object is executed.

In this foldable information processing apparatus 10, a user can separately operate each of the touch panel 101A and 101B (which may be hereinafter abbreviated as touch panels 101) by operating the operator 12. Further, the user can also perform operation across the touch panel 101A and 101B by operating the operator 12.

Further, particular processings such as selection of an object and moving of displayed contents are not the only operations performed by the information processing apparatus 10 in response to contact and move of the operator 12. For example, when the operator 12 moves along a predetermined path while the operator 12 is in contact with the touch panel 101, the information processing apparatus 10 performs a predetermined processing corresponding to the path along which the operator 12 has moved. In other words, the information processing apparatus 10 has a gesture input function. For example, when a predetermined gesture is input, an application associated with the gesture is started, or a predetermined processing associated with the gesture is executed.

For example, a user's finger and the like is used as the operator 12. Alternatively, for example, a stylus, a touch pen, and the like may be used as the operator 12. Alternatively, in a case where the touch panels 101 are optical type, any object can be the operator 12. For example, when the touch panels 101 are optical type, a soft tool such as a brush, with which it is difficult to press the touch panel 101, may be used as the operator 12. Alternatively, when the touch panels 101 are in-cell optical touch panels, any object can be the operator 12 as long as the object can throw its shadow over the touch panel 101.

Hereinafter, the in-cell optical touch panel will be briefly explained. There are several kinds of optical touch panels. For example, a relatively well-known optical touch panel is arranged with an optical sensor on an exterior frame of a liquid crystal panel constituting a liquid crystal display and performs a method for detecting, with this optical sensor, the position and the moving direction of the operator 12 which is in contact with the liquid crystal panel. In contrast to this method, the in-cell optical touch panel has an optical sensor array on a liquid crystal panel and has a mechanism to detect, with this optical sensor array, the position and the moving direction of the operator 12 which is in contact with the liquid crystal panel.

More particularly, optical sensors and lead circuits are formed on a glass substrate of the optical touch panel. The optical sensors detect light incident from the outside, and the lead circuits read the intensity thereof to recognize the shadow of the operator 12. As described above, the in-cell optical touch panel can detect the shape, the contacting area, and the like of the operator 12 on the basis of the shadow of the operator 12. Therefore, the in-cell optical touch panel can realize operation with a contacting "surface", which is considered to be difficult with other optical touch panels. When the in-cell optical touch panel is employed, the in-cell optical touch panel provides an advantage in improving the recognition accuracy and the display quality and further improving a design of a liquid crystal display and the like equipped with the in-cell optical touch panel.

The functions of the information processing apparatus 10 are achieved as a portable information terminal, a portable telephone, a portable game machine, a portable music player, broadcast equipment, a personal computer, a car navigation system, a home information appliance, or the like.

<Configuration of Information Processing Apparatus>

Subsequently, the configuration of the information processing apparatus according to the present embodiment will be described with reference to FIG. 2.

Figure 2:
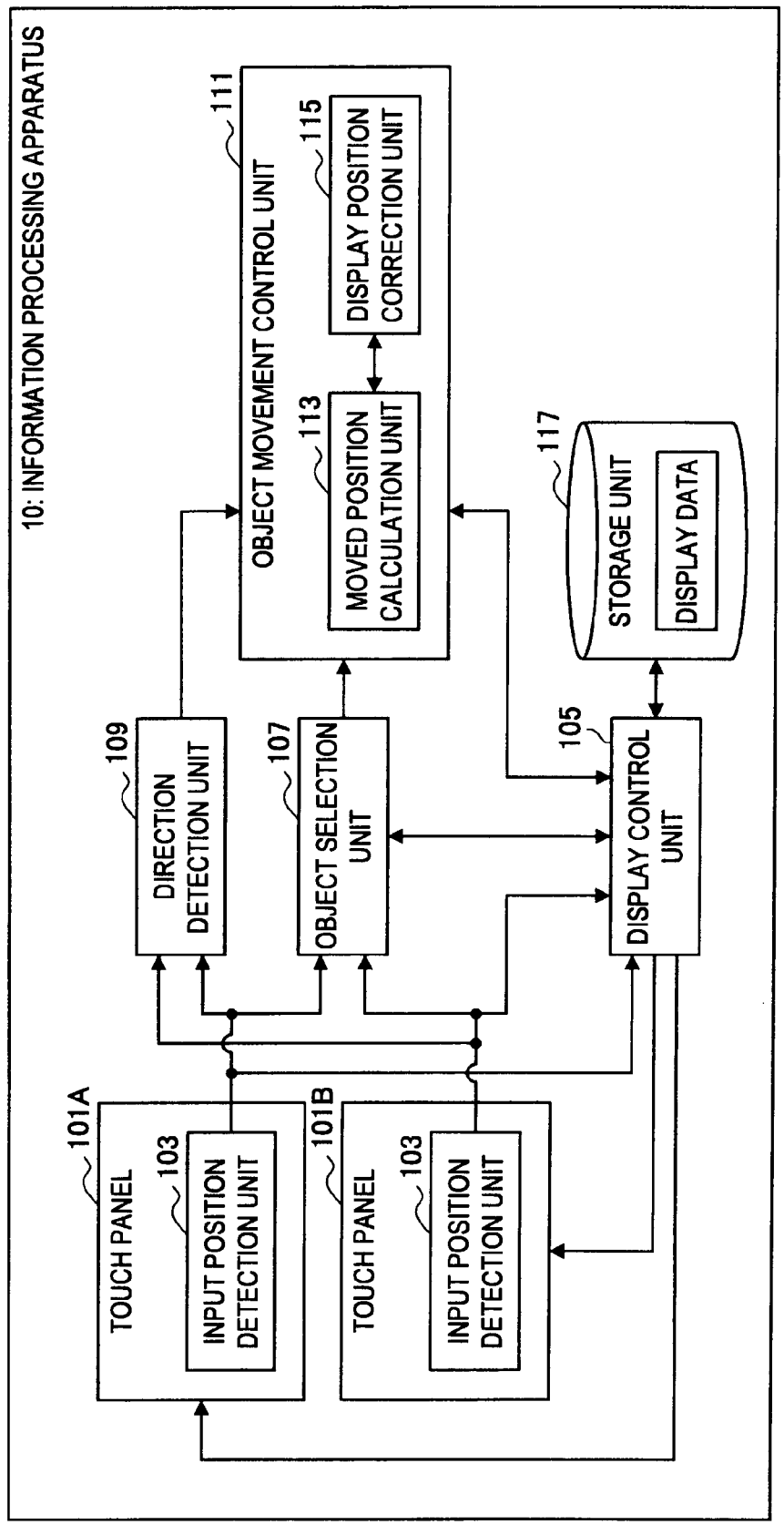
FIG. 2 is a block diagram for illustrating a configuration of the information processing apparatus according to the embodiment.

FIG. 2 is a block diagram for illustrating the configuration of the information processing apparatus according to the present embodiment.

As shown in FIG. 2, the information processing apparatus 10 according to the present embodiment mainly includes, for example, the two touch panel 101A and 101B, a display control unit 105, an object selection unit 107, a direction detection unit 109, an object movement control unit 111, and a memory unit 117.

The touch panel 101A and 101B are operation and input units arranged on the information processing apparatus 10 according to the present embodiment. These touch panels 101 may be the above-described electrostatic touch panels, pressure-sensitive touch panels, optical touch panels, and in-cell optical touch panels. These touch panels 101 may be formed integrally with a display unit such as a display device (not shown) or may be formed separately therefrom. Each of these touch panels 101 further includes an input position detection unit 103.

The input position detection unit 103 detects the position on the touch panel 101 in contact with the operator 12. The input position detection unit 103 may be configured to detect a pressing force exerted on the touch panel 101 when the operator 12 is in contact with the touch panel 101. Alternatively, even when the operator 12 is not in direct contact with the touch panel 101, the input position detection unit 103 may be adapted to detect the operator 12 present in proximity to the touch panel 101 in a space above the touch panel 101 so as to recognize the detected position as a contacting position. In other words, the contacting position, as referred to herein, may include positional information about operation performed by the operator 12 in such a manner as to cut the air above the screen of the touch panel 101.

Figure 3:
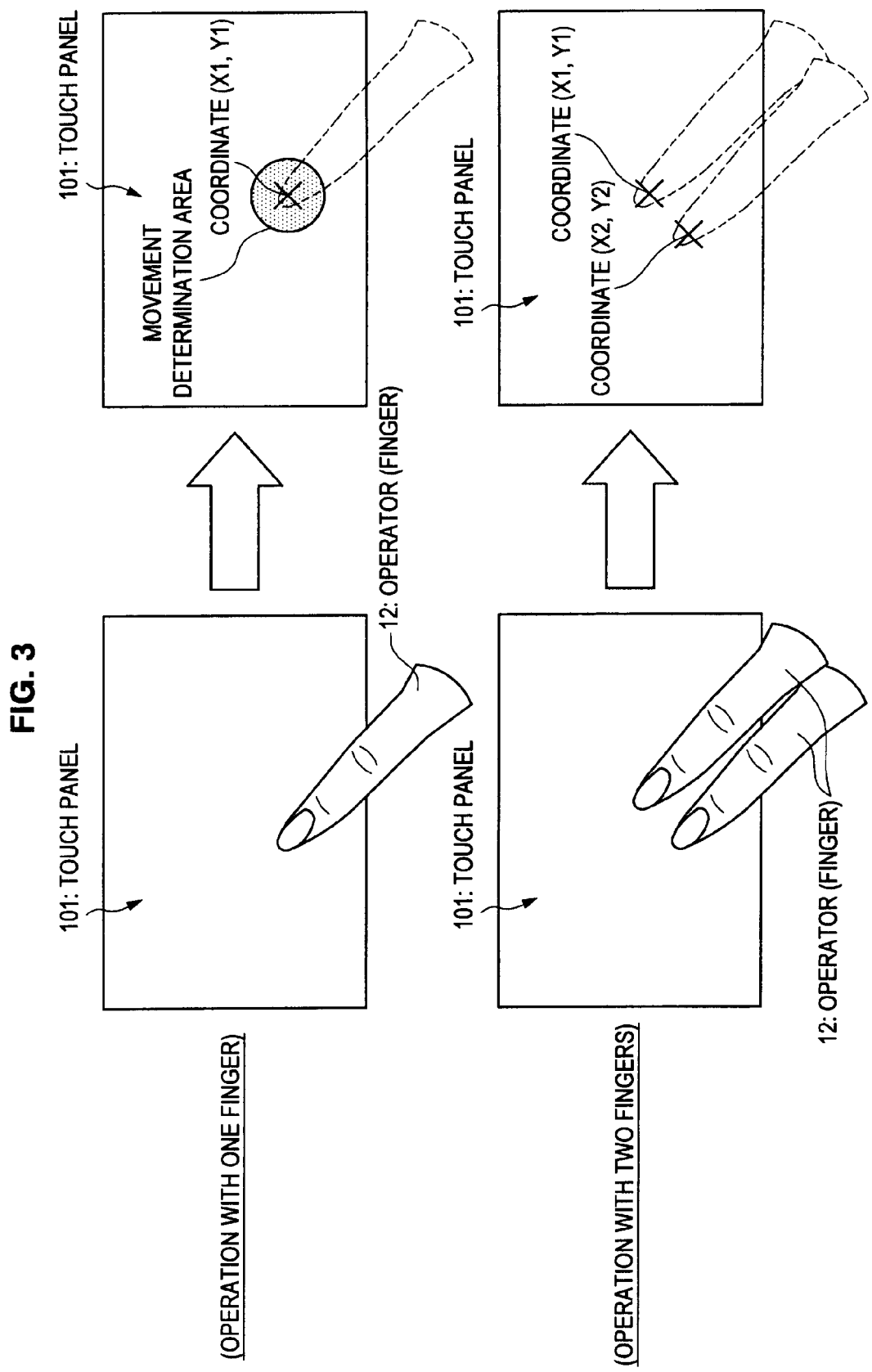
FIG. 3 is an explanatory diagram for illustrating the information processing apparatus according to the embodiment.

The input position detection unit 103 transmits the information about the detected contacting position (more specifically, a coordinate of the contacting position), as input position information, to the display control unit 105, an object selection unit 107, and the direction detection unit 109, which will be explained later. For example, when the detected contacting position includes only one position as shown in FIG. 3, the input position detection unit 103 outputs one coordinate (X1, Y1) as the input position information. Alternatively, when the detected contacting position includes two positions, the input position detection unit 103 outputs a plurality of detected coordinates (X1, Y1) and (X2, Y2).

The display control unit 105 is constituted by, for example, a CPU (Central Processing Unit), a ROM (Read Only Memory), and a RAM (Random Access Memory). The display control unit 105 is control means for controlling the contents displayed on the touch panels 101. For example, the display control unit 105 reads thumb nail images of any image data and object data of images such as pictures and album jackets recorded in the later-described memory unit 117, and displays the thumb nail images and the object data on the touch panels 101. At this moment, the display control unit 105 specifies a display position of the object and notifies the display position of the object to the touch panels 101 so as to cause the object data to be displayed at the display position. To this end, the display control unit 105 stores information about the display position and the like of the object to be displayed on the touch panel 101A and 101B. The information about the display position and the like of the object is transmitted from the display control unit 105 to the object selection unit 107.

The display control unit 105 receives input position information from the input position detection unit 103. For example, when the operator 12 in contact with the touch panel 101A and 101B moves, the display control unit 105 receives the input position information from the input position detection unit 103 in real time. The display control unit 105 obtains the object of the information processing apparatus 10 from the later-described memory unit 117 and the like, and displays the object on the display screen. Further, when the display control unit 105 receives information about a selected object from the later-described object selection unit 107, the display control unit 105 can change the display so as to emphasize the selected object. For example, the display control unit 105 can perform a control so as to increase the brightness of the selected object and decrease the brightness of the non-selected object.

The object selection unit 107 is constituted by, for example, a CPU, a ROM, and a RAM. The object selection unit 107 receives the input position information from the input position detection unit 103. The object selection unit 107 also receives the information about the display position of the object and the like from the display control unit 105. Then, the object selection unit 107 compares the input position information provided by the input position detection unit 103 and the information about the display position provided by the display control unit 105. Further, the object selection unit 107 detects an object selected with the operator 12. As a result of this processing, the object selection unit 107 transfers information about the object and the like, such as a selected object including a motion picture content and a selected thumbnail image, to the display control unit 105, the later-described object movement control unit 111, and the like.

The direction detection unit 109 is constituted by, for example, a CPU, a ROM, and a RAM. The direction detection unit 109 uses the coordinate value, i.e., the input position information transferred from the input position detection unit 103, to detect a direction in which the operator 12 moves.

Figure 4:
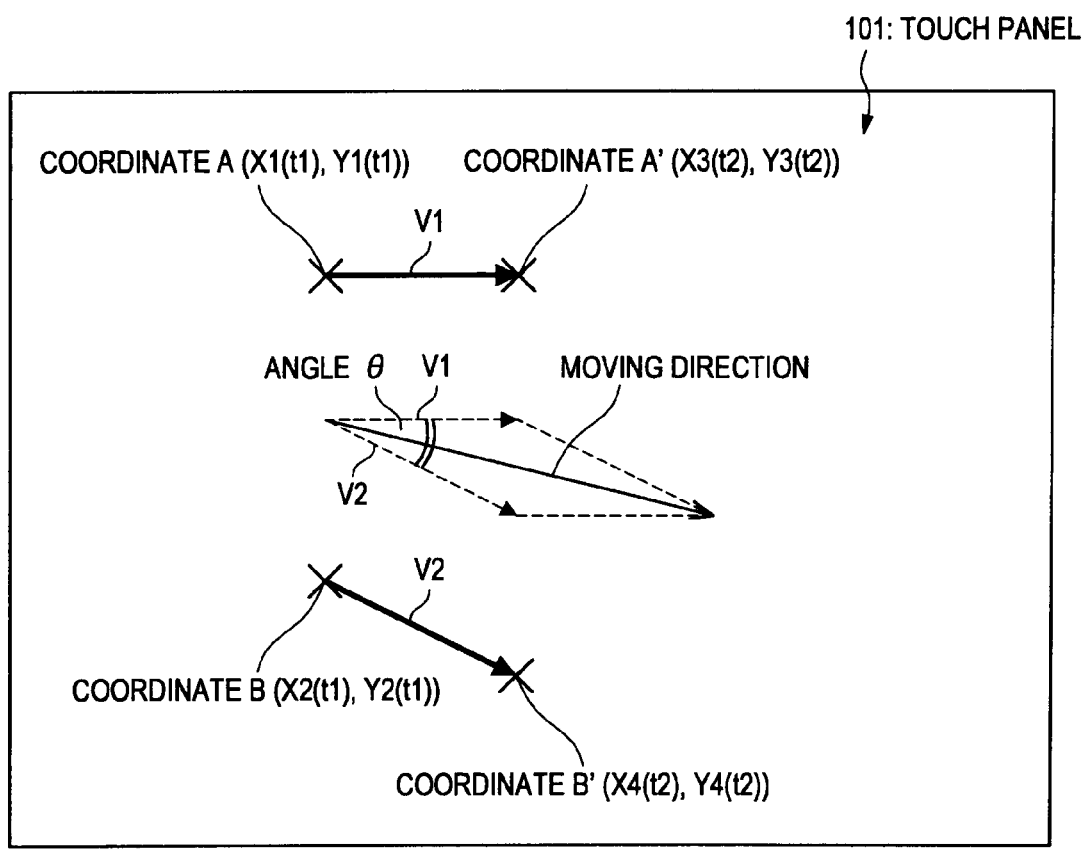
FIG. 4 is an explanatory diagram for illustrating the information processing apparatus according to the embodiment.

More particularly, the direction detection unit 109 detects the direction in which the operator 12 moves, on the basis of variation of the input position information that is transferred every time a predetermined time interval passes (for example, every time several milliseconds to several hundred milliseconds passes). For example, as shown in FIG. 4, a movement determination area used to determine whether the operator 12 moves or not is set in the direction detection unit 109. This movement determination area may be configured to be any size in accordance with performance such as a resolution for distinguishing two contacting positions adjacent to each other on the touch panels 101. For example, the movement determination area may have a radius of approximately ten pixels. When the transferred input position information changes beyond this movement determination area, the direction detection unit 109 determines that the operator 12 has moved. Alternatively, when the transferred input position information changes within the movement determination area, the direction detection unit 109 can determine that a so-called tapping operation has been performed with the operator 12. This determination as to whether the operator 12 has moved or not is made with respect to all of the input position information transferred at a time. In other words, when two coordinate values are transferred as the input position information at a time, the direction detection unit 109 makes a determination, as described above, on each of these two coordinate values changing with time.

When the transferred input position information changes beyond this movement determination area, the direction detection unit 109 detects, as a moving direction, a direction of a vector along a locus generated from the transferred input position information changing with time. The size of the vector represents the moving distance of the operator 12.

For example, as shown in FIG. 4, a case will be considered where the input position detection unit 103 transfers input position information about a coordinate A (X1(t1), Y1(t1)) at a time t1, and a position at a time t2 corresponding to this input position information has a coordinate A' (X3(t2), Y3(t2)). In this case, the direction detection unit 109 detects a direction represented by a vector V1 between the start coordinate A and the end coordinate A' as the moving direction of the operator 12 in contact with the coordinate A. Further, the direction detection unit 109 obtains the size of the vector V1 as the moving distance of the operator 12.

Alternatively, as shown in FIG. 4, it is assumed that the input position detection unit 103 transfers input position information about a coordinate A (X1(t1), Y1(t1)) and a coordinate B (X2(t1), Y2(t1)) at the time t1. Also in this case, a vector V1 and a vector V2 are defined on the basis of coordinates A' and B' at the time t2 respectively corresponding to the input position information about the coordinate A and the input position information about the coordinate B. When the plurality of pieces of input position information are transferred at a time, the direction detection unit 109 does not obtain each vector generated from each input position information as the moving direction but determines the moving direction by the following method.

For example, as shown in FIG. 4, the direction detection unit 109 can decide a direction corresponding to a sum of the two vectors V1 and V2 as the moving direction. Alternatively, when not only two but also three or more input position coordinates are transferred at a time, the moving direction can be uniquely decided by obtaining a sum of vectors defined based on input position coordinates changing with time. When the moving direction is decided based on a plurality of vectors, the direction detection unit 109 may obtain the magnitude of the sum of the vectors as the moving distance of the operator 12 or may obtain a magnitude of any one of the vectors as the moving distance of the operator 12.

Alternatively, as shown in FIG. 4, the direction detection unit 109 can determine the moving direction on the basis of an angle θ between the two vectors V1 and V2. Also in this case, when three or more input position coordinates are transferred at a time, the direction detection unit 109 defines a vector defined based on each input position coordinate changing with time. Subsequently, the direction detection unit 109 chooses one of the defined vectors and can determine the moving direction on the basis of an angle between this chosen vector and another vector. In other words, when the angle θ therebetween is less than a predetermined threshold value, for example, the angle θ therebetween is an acute angle, this means that each vector in a similar direction. In contrast, when the angle θ therebetween is more than the predetermined threshold value, for example, the angle θ therebetween is an obtuse angle, this means that each vector is in a direction away from each other.

Further, the direction detection unit 109 can calculate a moving speed, an acceleration, and the like of the operator 12 on the basis of the detected moving distance and the detected moving time of the operator 12. The direction detection unit 109 can determine whether operation performed with the operator 12 is a so-called drag operation or a so-called flick operation on the basis of the moving distance, the moving speed, the acceleration, and the like. The drag operation means dragging the operator 12 on the touch panel 101, in which the operator 12 is considered to move at a substantially constant moving speed. The flick operation means flicking the touch panel 101, in which the operator 12 is considered to move at a fast moving speed (or a large acceleration) in a short time.

The direction detection unit 109 transfers direction information including the moving direction and the moving distance of the operator 12, which has been detected as described above, to the object movement control unit 111. In addition, the direction detection unit 109 also transfers a determination result as to whether the operation performed with the operator 12 is the drag operation or the flick operation to the object movement control unit 111.

The object movement control unit 111 is constituted by, for example, a CPU, a ROM, and a RAM. The object movement control unit 111 receives the information about an object selected with the operator 12 (hereinafter referred to as selected object information) transferred from the object selection unit 107. Further, the object movement control unit 111 receives the information about the moving direction and the moving distance of the operator 12 and information about the type of operation performed with the operator 12 (hereinafter referred to as operation type information) transferred from the direction detection unit 109. Further, the object movement control unit 111 receives information about the display position of, e.g., an object from the display control unit 105.

The object movement control unit 111 controls the movement of the selected object, on the basis of the selected object information, the information about the moving direction and the moving distance of the operator, and the operation type information.

Figure 5A:
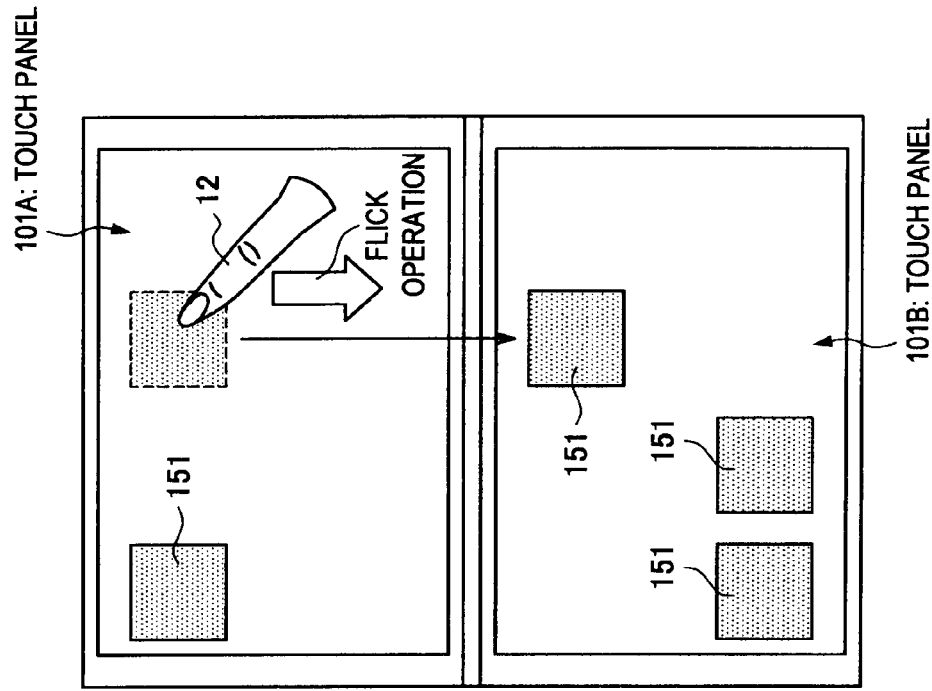
FIG. 5A is an explanatory diagram for illustrating the information processing apparatus according to the embodiment.

For example, as shown in FIG. 5A, when a drag operation is performed on an object 151 selected with the operator 12, the object movement control unit 111 causes the selected object 151 to follow a trace of the operator 12 in the same screen. In other words, when the drag operation is performed on the selected object 151, this selected object 151 does not move across the screens. In the example shown in FIG. 5A, the object 151 selected with the operator 12 is displayed on the touch panel 101A side, and therefore, this object follows the movement of the operator 12 in the touch panel 101A.

Figure 5B:
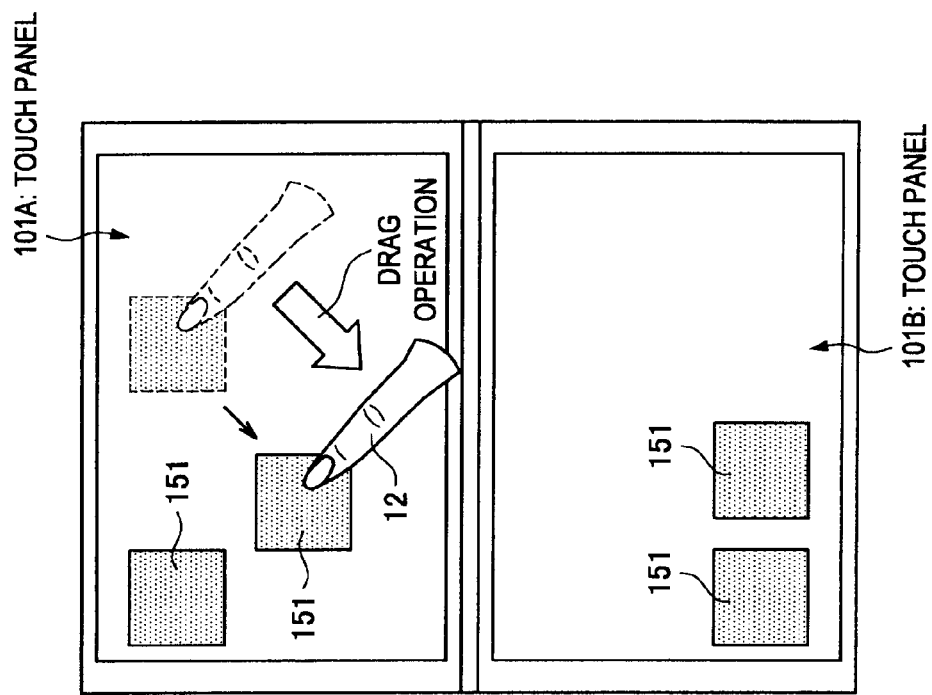
FIG. 5B is an explanatory diagram for illustrating the information processing apparatus according to the embodiment.

As shown in FIG. 5B, when a flick operation (operation to flick the object) is performed on the object 151 selected with the operator 12, the object movement control unit 111 quickly scrolls the selected object 151 in the moving direction of the operator 12. When the object 151 is scrolled, the object 151 keeps on moving as if by inertia in accordance with, e.g., the moving speed, the moving distance, and the acceleration of the operator 12, even after the operator 12 leaves the object 151. In other words, after the operator 12 leaves the object 151, the object movement control unit 111 moves the object at a constant moving speed, and thereafter, gradually decreases the moving speed. After the object has automatically moved a certain distance, the object movement control unit 111 controls the object to stop. The position to which the object 151 moves is determined on the basis of, for example, the moving speed, the moving distance, and the like of the operator 12.

Further, as shown in FIG. 5B, the object 151, on which a flick operation is performed, can move across the screens. Namely, in the example shown in FIG. 5B, the object 151, on which the flick operation is performed, is displayed on the touch panel 101A side, but the object 151 can move to the touch panel 101B side in accordance with the flick operation.

The object movement control unit 111 controlling movement of the object as described above further includes the moved position calculation unit 113 and the display position correction unit 115.

The moved position calculation unit 113 is constituted by, for example, a CPU, a ROM, and a RAM. The moved position calculation unit 113 calculates a moved position to which the selected object moves, on the basis of the selected object information, the information about the moving direction and the moving distance of the operator, and the operation type information.

More particularly, when the operation type information represents drag operation, the moved position calculation unit 113 calculates a moved position to which the object moves such that a point of the image representing the object at which the operator 12 is in contact with the object corresponds to a coordinate of the operator 12 after the operator 12 moves on the touch panels 101. When the operation type information represents flick operation, the moved position calculation unit 113 calculates a position which the selected object automatically moves to and ultimately stops at, on the basis of, e.g., the moving direction, the moving distance, the moving speed, and the acceleration of the operator 12. Alternatively, the position at which the selected object ultimately stops may be a coordinate of a position at which a distinctive point such as a barycenter of the object stops, or may be a coordinate of an edge of the object (for example, a side of the object when the object is in a rectangular shape).

When the moved position calculation unit 113 calculates the moved position to which the object moves, the object movement control unit 111 can recognize at which position the object, displayed as a certain size on the display screen, will be ultimately displayed.

The moved position calculation unit 113 transfers information about the moved position to which the object moves obtained by calculation (hereinafter referred to as moved position information) to the display position correction unit 115.

The display position correction unit 115 is constituted by, for example, a CPU, a ROM, and a RAM. The display position correction unit 115 determines whether the display position of the object should be corrected, on the basis of the moved position information of the selected object transferred from the moved position calculation unit 113. When the display position is to be corrected, the display position correction unit 115 determines a corrected display position of the object.

More specifically, the display position correction unit 115 determines whether at least a portion of the moved object resides in the non-display region or not, on the basis of the transferred moved position information about the object and the size of the object on the display screen. In other words, the display position correction unit 115 determines whether the entire moved object is displayed in the same touch panel 101, on the basis of the moved position information, the size of the object on the display screen, and the size of the display screen (i.e., the touch panels 101). The non-display region referred to herein corresponds to the connection unit located between the touch panel 101A and the touch panel 101B, and is a region in which various information including the object is not displayed. When at least a portion of the moved object resides in the non-display region, the object is displayed across the two touch panels 101A and 101B, namely, the object is displayed in such a manner that the object is divided by the non-display region. Therefore, the display position correction unit 115 determines that the display position of the moved object is to be corrected. When the entire moved object is displayed in a same touch panel 101, the display position correction unit 115 determines that the display position of the moved object is not to be corrected.

Figure 6:
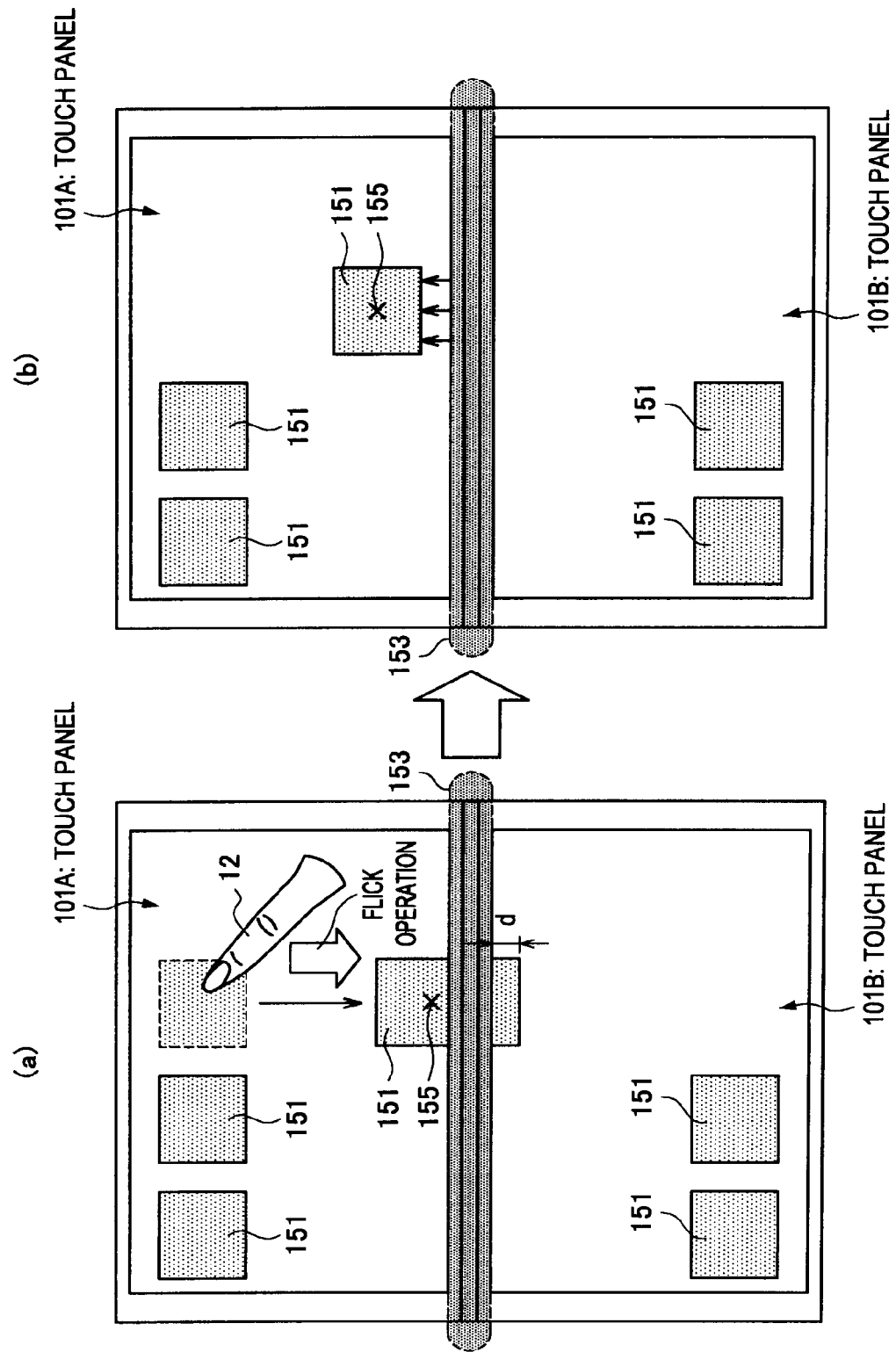
FIG. 6 is an explanatory diagram for illustrating the information processing apparatus according to the embodiment.
Figure 7:
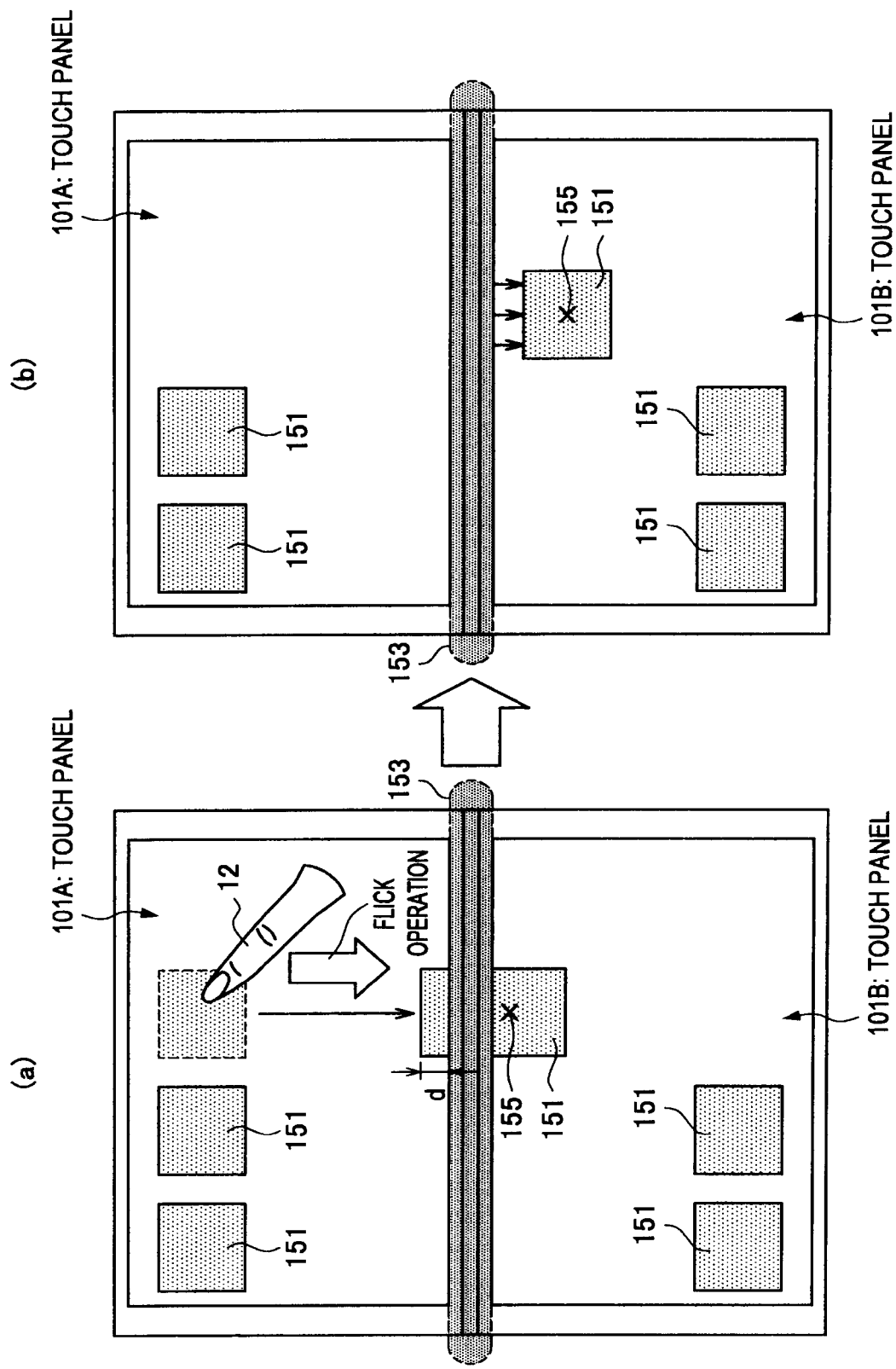
FIG. 7 is an explanatory diagram for illustrating the information processing apparatus according to the embodiment.

When the display position is determined to be corrected, the display position correction unit 115 determines the direction in which the object is moved in accordance with which the two touch panels 101A and 101B the barycenter of the image of the moved object belongs to. The method for determining the direction in which the object is moved will be described in detail with reference to FIGS. 6 and 7.

For example, as shown in FIG. 6A, a case will be considered where the moved object 151 is divided by a non-display region 153 and where a barycenter 155 of the image of the object resides in the touch panel 101A. In this case, as shown in FIG. 6B, the display position correction unit 115 requests the object movement control unit 111 to move the corresponding object 151 to the touch panel 101A side in which the barycenter 155 resides.

Further, the display position correction unit 115 configures the moving distance of the corresponding object to be equal to or more than the size of the corresponding object extending into one of the touch panels 101 in which the barycenter 155 does not reside. In other words, in the example shown in FIG. 6A, the length d of the corresponding object extending into the touch panel 101B is configured to be the minimum moving distance.

The display position correction unit 115 transfers the determined moving direction and the determined minimum moving distance to the object movement control unit 111. The object movement control unit 111 moves the display position of the corresponding object 151 to the upper side. When the display position is thus corrected, the object residing across the two screens is displayed in one screen.

On the other hand, for example, as shown in FIG. 7A, a case will be considered where the moved object 151 is divided by the non-display region 153 and where the barycenter 155 of the image of the object resides in the touch panel 101B side. In this case, the display position correction unit 115 requests the object movement control unit 111 to move the corresponding object 151 to the touch panel 101B side in which the barycenter 155 resides as shown in FIG. 7B. In this case, the display position correction unit 115 also configures the minimum moving distance to be the length d of the corresponding object 151 extending into the touch panel 101A side.

It should be noted that FIG. 6B and FIG. 7B illustrates a case where the object movement control unit 111 moves the corresponding object 151 by 2d. In addition, when the display position of the object is corrected, the object movement control unit 111 may apply an animation to the object such that the object, being about to stop, reaccelerates and springs out into the corresponding touch panel side. When this kind of animation is applied, a user is reminded that "the object may not be placed in the connection unit (i.e., the non-display region)."

In this way, the display position correction unit 115 can determine the moving direction of correction, on the basis of, in principle, which of the touch panels 101 the barycenter of the object resides in. In the following cases, however, the display position correction unit 115 may determine the moving direction of correction, not on the basis of the barycenter of the object but on the basis of the moving direction of the operator 12.

Case 1: an object having moved to a different screen changes its attribute

Case 2: a large object occupying much space on the display screen is operated

Case 3: an object in proximity to the non-display region is operated

[Case 1: An Object Having Moved to a Different Screen Changes its Attribute]

First, a correction processing where an object having moved to a different screen changes its attribute will be described in detail with reference to FIG. 8.

In this case, an attribute of objects displayed on the touch panel 101A is different from an attribute of objects displayed on the touch panel 101B. When an object is moved to a different screen, the attribute of the object changes. Examples of the attribute of the object include an owner of information corresponding to the object and location information representing the location of the object.

Figure 8:
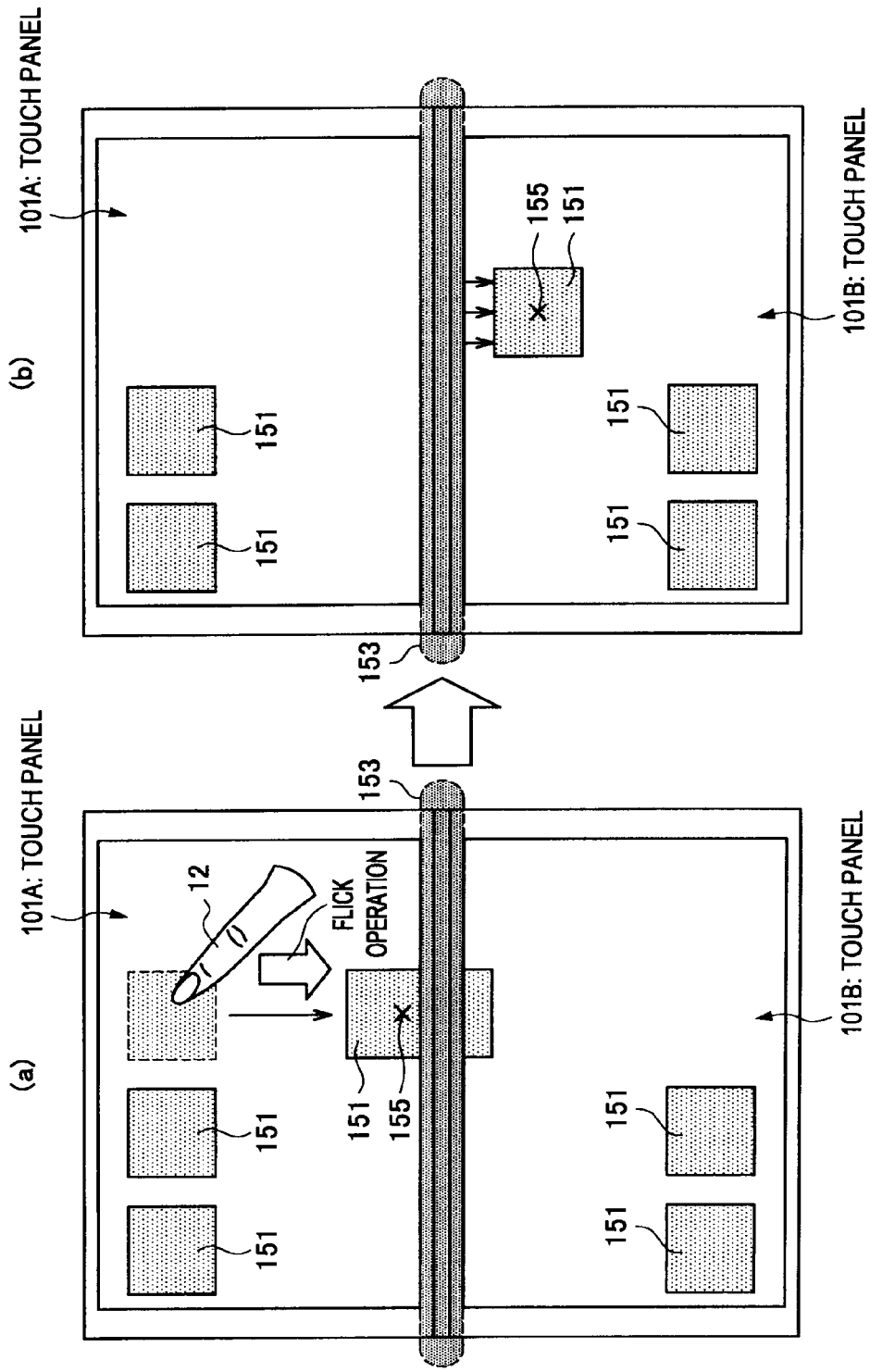
FIG. 8 is an explanatory diagram for illustrating the information processing apparatus according to the embodiment.

In FIG. 8, the touch panel 101A displays objects relating to contents owned by a user A, and the touch panel 101B displays objects relating to contents owned by a user B. In this case, it is assumed that, when the object displayed on the touch panel 101A is moved to the touch panel 101B, information representing the owner of the corresponding object changes to the owner B.

In this case, when a user performs a flick operation on an object 151 toward downward direction, it is considered that the user wants to move the corresponding object 151 to the touch panel 101B side. Therefore, as shown in FIG. 8A, even when the object is displayed across both of the screens, and the barycenter of the object resides in the touch panel 101A, the display position correction unit 115 takes the user's intention into consideration, and accordingly requests the object movement control unit 111 to move the object to the touch panel 101B side. On the other hand, when the barycenter 155 of the object 151 resides in the touch panel 101B side, the display position correction unit 115 configures the moving direction of correction to be toward a touch panel in which the barycenter resides in accordance with the principle.

[Case 2: A Large Object Occupying Much Space on the Display Screen is Operated]

Figure 9:
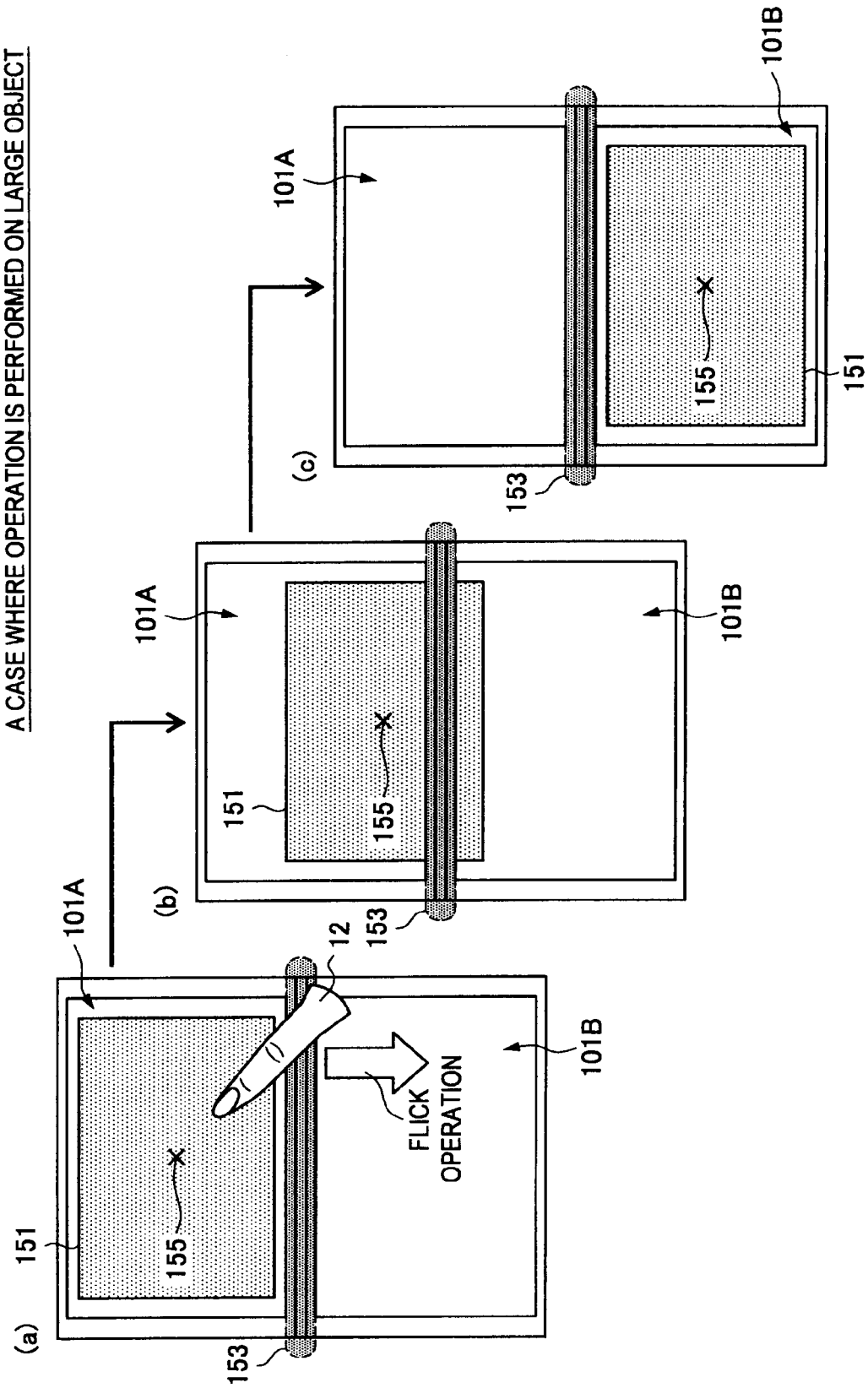
FIG. 9 is an explanatory diagram for illustrating the information processing apparatus according to the embodiment.

Next, a correction processing where a large object occupying much space on the display screen is operated will be described in detail with reference to FIG. 9.

As shown in FIG. 9A, this case relates to the correction processing where a flick operation is performed on a large object occupying much space on the display screen. In this case, it is assumed that a flick operation is performed on a large object as shown in FIG. 9A, and the object is displayed across both of the screens as shown in FIG. 9B.

Also in this case, when a user performs a flick operation on an object 151 toward downward direction in the same manner as the above case 1, it is considered that the user wants to move the corresponding object 151 to the touch panel 101B side. Therefore, as shown in FIG. 9C, even when the object is displayed across both of the screens, and the barycenter of the object resides in the touch panel 101A, the display position correction unit 115 takes the user's intention into consideration, and accordingly requests the object movement control unit 111 to move the object to the touch panel 101B side. On the other hand, when the barycenter 155 of the object 151 resides in the touch panel 101B side, the display position correction unit 115 configures the moving direction of correction to be toward a touch panel in which the barycenter resides in accordance with the principle.

[Case 3: An Object in Proximity to the Non-Display Region is Operated]

Figure 10:
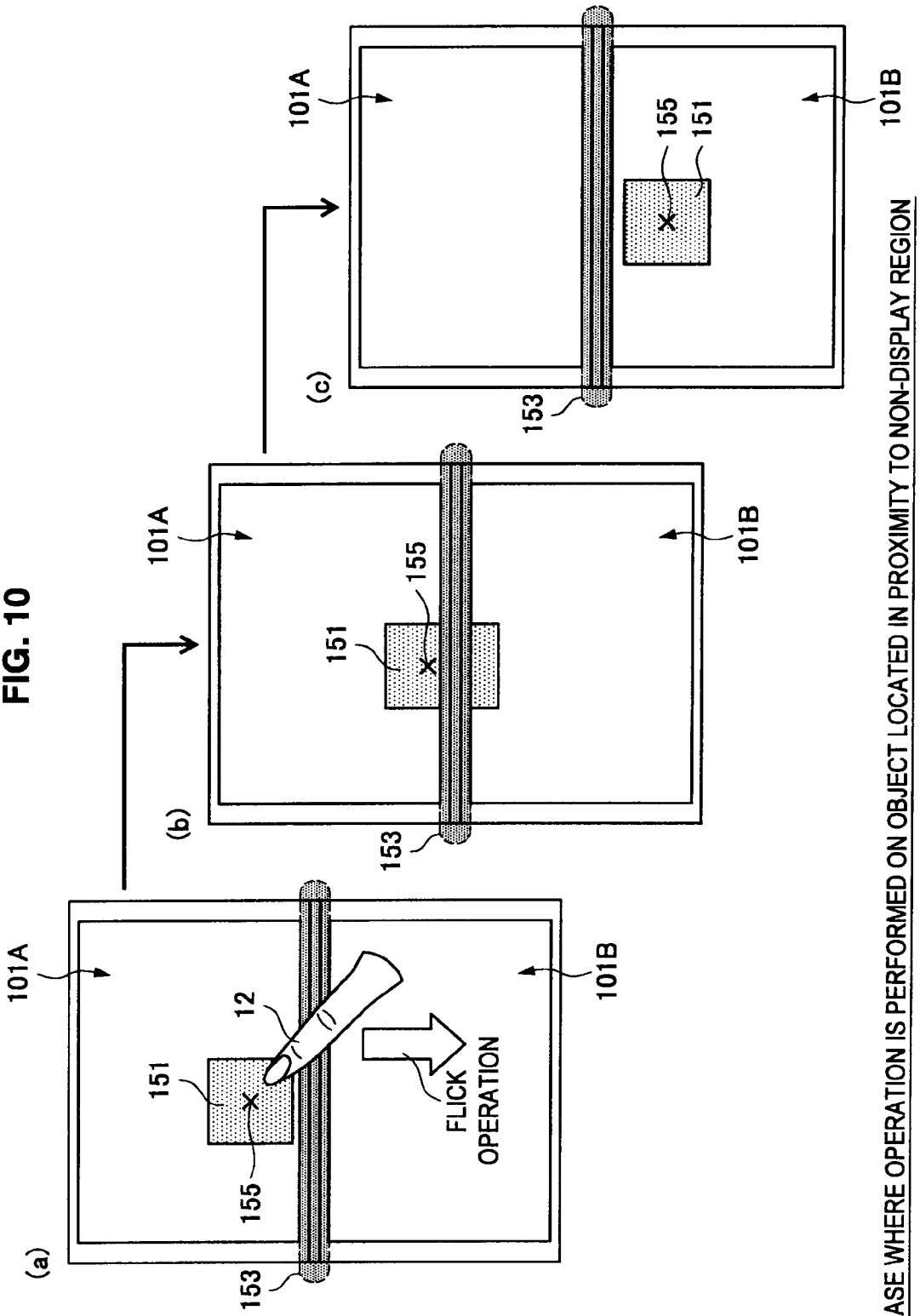
FIG. 10 is an explanatory diagram for illustrating the information processing apparatus according to the embodiment.

Subsequently, a correction processing where an object in proximity to the non-display region is operated will be described in detail with reference to FIG. 10.

As shown in FIG. 10A, this case relates to the correction processing where a flick operation is performed on an object 151 adjacent to or in proximity to the non-display region 153. In this case, it is assumed that a flick operation is performed on the object 151 in proximity to the non-display region 153 as shown in FIG. 10A, and the object is displayed across both of the screens as shown in FIG. 10B.

Also in this case, when a user performs a flick operation on the object 151 toward downward direction in the same manner as the above cases 1 and 2, it is considered that the user wants to move the corresponding object 151 to the touch panel 101B side. Therefore, as shown in FIG. 10C, even when the object is displayed across both of the screens, and the barycenter of the object resides in the touch panel 101A, the display position correction unit 115 takes the user's intention into consideration, and accordingly requests the object movement control unit 111 to move the object to the touch panel 101B side. On the other hand, when the barycenter 155 of the object 151 resides in the touch panel 101B side, the display position correction unit 115 configures the moving direction of correction to be toward a touch panel in which the barycenter resides in accordance with the principle.

As described above, the display position correction unit 115 corrects the display position of the moved object displayed across both of the screens in accordance with the position of the barycenter of the object or the moving direction of the operator.

The memory unit 117 of the information processing apparatus 10 according to the present embodiment will be hereinafter described with reference back to FIG. 2.

The memory unit 117 stores object data to be displayed on the touch panel 101A and 101B. The object data referred to herein includes, for example, any part constituting graphical user interface (hereinafter referred to as GUI) such as an icon, a button, and a thumbnail. The memory unit 117 also stores attribute information in association with each object data. Examples of the attribute information include creation date, last modified date, name of creator, and name of modifier of object data or entity data, type of entity data, size of entity data, level of importance, level of priority, and the like.

The memory unit 117 also stores entity data corresponding to object data in such a manner that the entity data and the object data are associated with each other. The entity data referred to herein means data corresponding to a predetermined processing executed when an object displayed on the touch panel 101A and 101B is operated. For example, the object data corresponding to a motion picture content is associated with the content data of the motion picture content as entity data. The memory unit 117 also stores a motion picture reproduction application for reproducing the motion picture content in association with the object data, the content data, or the attribute information.

The object data stored in the memory unit 117 is read by the display control unit 105, and is displayed on the touch panel 101A and 101B.

The memory unit 117 can store, as necessary, not only these data but various parameters and intermediate data or various databases, which are to be saved when the information processing apparatus 10 performs a certain processing. This memory unit 117 can be freely read and written by the input position detection unit 103, the display control unit 105, the object selection unit 107, the direction detection unit 109, the object movement control unit 111, the moved position calculation unit 113, the display position correction unit 115, and the like.

Exemplary functions of the information processing apparatus 10 according to the present embodiment have been described hereinabove. Each of the above constituent elements may be made with a generally-used member and circuit, or may be made with hardware dedicated for the function of each constituent element. Alternatively, all of the functions of the constituent elements may be performed by a CPU and the like. Therefore, the used configuration may be changed as necessary in accordance with the technical level at the time of carrying out the present embodiment.

It is possible to make a computer program for realizing the functions of the above-described information processing apparatus according to the present embodiment, and the computer program can be implemented on a personal computer and the like. Further, a computer-readable recording medium storing such computer program can be provided. Examples of the recording medium include a magnetic disk, an optical disk, a magneto-optical disk, and a flash memory. Further, the above computer program may be distributed by, for example, a network, without using the recording medium.

<Regarding Information Processing Method>

Figure 11:
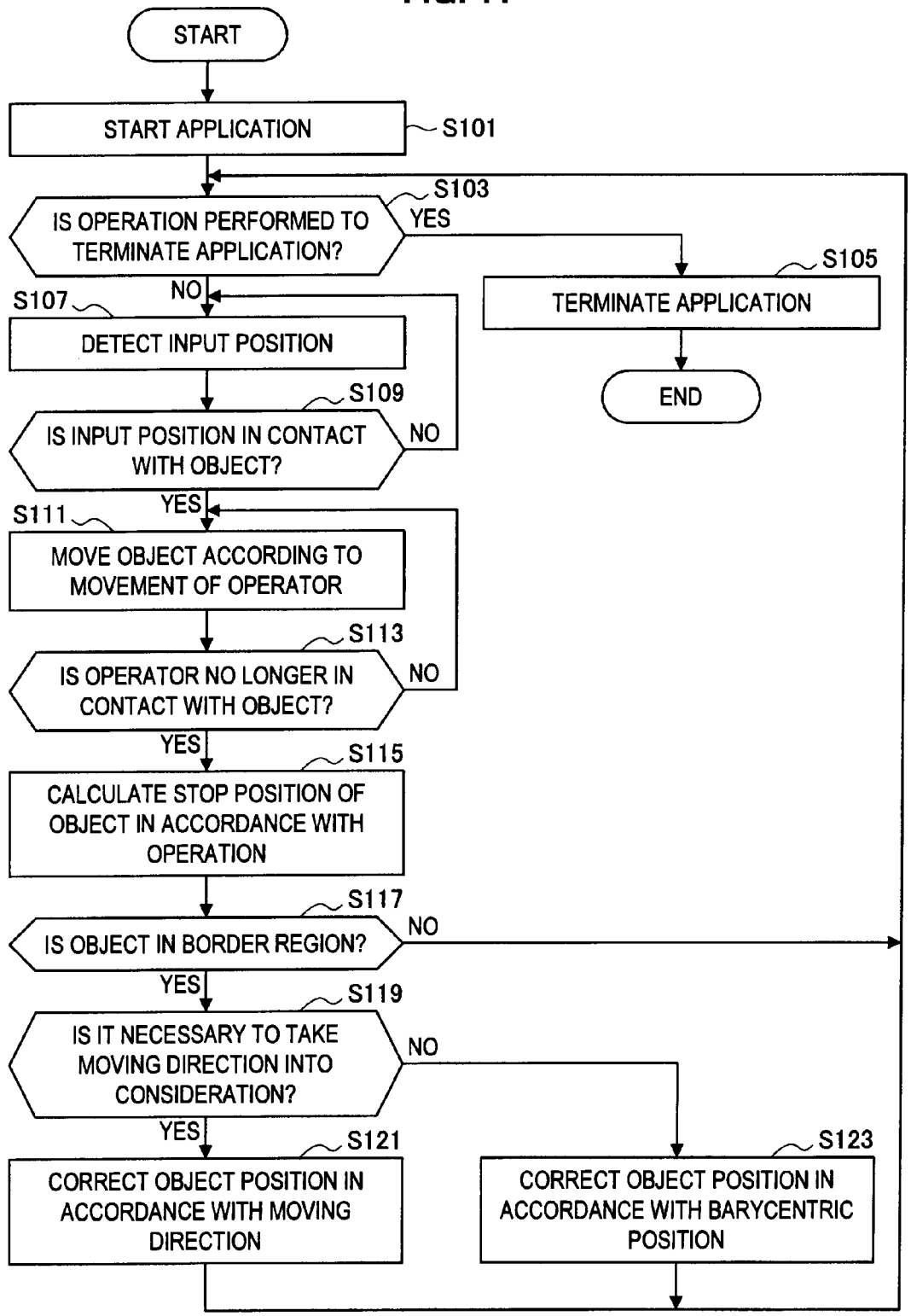
FIG. 11 is a flow diagram for illustrating an information processing method according to the embodiment.

The information processing method according to the present embodiment will be hereinafter described in detail with reference to FIG. 11. FIG. 11 is a flowchart for illustrating the information processing method according to the present embodiment.

First, a user of the information processing apparatus 10 uses the operator 12 such as a finger and a stylus to operate the touch panels 101A and 101B so as to select an object such as an icon associated with an application for, e.g., displaying a list of objects. Therefore, the information processing apparatus 10 starts an application associated with the selected object (step S101).

Subsequently, the information processing apparatus 10 waits for receiving an input from the user, and makes a determination as to whether the information processing apparatus 10 receives an input of operation for terminating the application (step S103). When the information processing apparatus 10 receives an input of operation for terminating the application from the user, the information processing apparatus 10 terminates the application currently running (step S105).

When the information processing apparatus 10 does not receive an input of operation for terminating the application, the information processing apparatus 10 keeps on waiting for an input from the user.

When the user operates the operator 12 to touch the touch panel 101A or the touch panel 101B, the input position detection unit 103 of the corresponding touch panel detects a position at which the operator 12 is in contact with the touch panels 101 (step S107). The input position detection unit 103 transfers a corresponding coordinate of the contacting position, as input position information, to the display control unit 105, the object selection unit 107, and the direction detection unit 109.

The object selection unit 107 makes a determination as to whether the operator 12 is in contact with the object, on the basis of the transferred input position information and information about the display position of the object obtained from the display control unit 105 (step S109). When the operator 12 is determined not to be in contact with the object, the information processing apparatus 10 returns back to step S107 again to detect the input position. When the operator 12 is determined to be in contact with the object, the object selection unit 107 transfers information about the selected object to the object movement control unit 111. The moved position calculation unit 113 of the object movement control unit 111 calculates the moved position to which the object moves transferred from the object selection unit 107, on the basis of the moving direction of the operator 12 transferred from the direction detection unit 109. The object movement control unit 111 moves the object in accordance with the moved position calculated by the moved position calculation unit 113 (step S111). Therefore, the object selected with the operator 12 moves with the movement of the operator 12.

When the object selection unit 107 determines that the operator 12 is no longer in contact with the object (step S113), the moved position calculation unit 113 calculates a stop position of the object in accordance with the type of operation (step S115). More particularly, when the operation performed with the operator 12 is a drag operation, the moved position calculation unit 113 stops the movement of the selected object as soon as the operator 12 is no longer in contact. When the operation performed with the operator 12 is a flick operation, the moved position calculation unit 113 calculates the stop position of the object, on the basis of, e.g., the moving distance, the moving speed, and the acceleration, and the object movement control unit 111 automatically moves the object to the moved position calculated by the moved position calculation unit 113.

Then, the display position correction unit 115 determines whether at least a portion of the image of the object resides in the non-display region or not, on the basis of the calculated stop position of the object, the size of the image of the object, and the size of the display area (step S117). When any portion of the image of the object does not reside in the non-display region, the information processing apparatus 10 returns back to step S103 to wait for receiving operation performed by the user. On the other hand, at least a portion of the image of the object resides in the non-display region, the display position correction unit 115 determines whether the moving direction is to be taken into consideration or not (step S119).

More particularly, the display position correction unit 115 references, e.g., the attribute information of the object displayed on each of the touch panels 101, the size of the image of the object, and the display position of the object, and determines whether the moving direction is to be taken into consideration or not. In a case where the user's intention of the operation is to be taken into consideration such as the above described case 1 to case 3, the display position correction unit 115 corrects the display position of the object, not on the basis of the barycenter of the image of the object but on the basis of the moving direction of the operator 12 (step S121). On the other hand, when the user's intention of the operation is not to be taken into consideration, the display position correction unit 115 corrects the display position of the object, on the basis of the barycenter of the image of the object (step S123).

When the above correction processing is finished, the information processing apparatus 10 returns back to step S103 to wait for operation performed by the user.

As described above, in the information processing method according to the present embodiment, an object can be moved from the non-display region on the basis of the display position of the object or the moving direction of the operator when at least a portion of the image of the object resides in the non-display region.

<Regarding Hardware Configuration>

Subsequently, the hardware configuration of the information processing apparatus 10 according to each embodiment of the present invention will be described in detail with reference to FIG. 12. FIG. 12 is a block diagram for illustrating the hardware configuration of the information processing apparatus 10 according to each embodiment of the present invention.

The information processing apparatus 10 mainly includes a CPU 901, a ROM 903, and a RAM 905. The information processing apparatus 10 further includes a host bus 907, a bridge 909, an external bus 911, an interface 913, an input device 915, an output device 917, a storage device 919, a drive 921, a connection port 923, and a communication device 925.

The CPU 901 serves as an arithmetic processing apparatus and control apparatus to control overall operation or a portion of operation in the information processing apparatus 10 in accordance with various programs stored in the ROM 903, the RAM 905, the storage device 919, or a removable recording medium 927. The ROM 903 stores programs, operation parameters, and the like used by the CPU 901. The RAM 905 primarily stores programs used during execution of the CPU 901 and parameters and the like varying during the execution as necessary. These are connected with each other via the host bus 907 constituted by an internal bus such as a CPU bus.

The host bus 907 is connected to the external bus 911 such as a PCI (Peripheral Component Interconnect/Interface) via the bridge 909.

The input device 915 is operation means operated by a user, such as a mouse, a keyboard, a touch panel, buttons, switches and levers. The input device 915 may be remote control means (a so-called remote controller) using, for example, infrared light and other radio waves, or may be an externally connected device 929 such as a portable telephone and a PDA adapted to operate the information processing apparatus 10. The input device 915 generates an input signal based on, for example, information input by a user with the above operation means, and is constituted by an input control circuit for outputting the input signal to the CPU 901. A user of the information processing apparatus 10 operates this input device 915 to input various data to the information processing apparatus 10 and instructs the information processing apparatus 10 to perform processings and operation.

The output device 917 is constituted by a device capable of audibly or visually notifying obtained information to a user. Examples of the output device 917 include display devices such as a CRT display device, a liquid crystal display device, a plasma display device, an EL display device, and lamps, audio output devices such as a speaker and a headphone, a printer, a portable telephone, and a facsimile machine. The output device 917 outputs a result obtained from various processings performed by, for example, the information processing apparatus 10. More specifically, the display device displays a result, as texts or images, obtained from various processings performed by the information processing apparatus 10. On the other hand, the audio output device converts an audio signal such as reproduced audio data and sound data into an analog signal, and outputs the analog signal.

The storage device 919 is an example of a storage unit of the information processing apparatus 10 and is adapted to store data. The storage device 919 is constituted by, for example, a magnetic storage device such as a HDD (Hard Disk Drive), a semiconductor storage device, an optical storage device, or a magneto-optical storage device. This storage device 919 stores, for example, programs and various data executed by the CPU 901 and various data obtained from the outside.

The drive 921 is a reader/writer for recording medium, and is embedded in the information processing apparatus 10 or attached externally thereto. The drive 921 reads information stored in the loaded removable recording medium 927 such as a magnetic disk, an optical disk, a magneto-optical disk, or a semiconductor memory, and outputs the read information to the RAM 905. The drive 921 can record the loaded removable recording medium 927 such as a magnetic disk, an optical disk, a magneto-optical disk, or a semiconductor memory. The removable recording medium 927 is, for example, a DVD medium, an HD-DVD medium, and a Blu-ray medium. The removable recording medium 927 may be a CompactFlash (registered trademark) (CompactFlash: CF), a memory stick, or an SD memory card (Secure Digital Memory Card). Alternatively, the removable recording medium 927 may be, for example, an IC card (Integrated Circuit Card) mounted with a non-contact IC chip or an electronic appliance.

The connection port 923 is a port for allowing apparatuses to directly connect to the information processing apparatus 10. Examples of the connection port 923 include a USB (Universal Serial Bus) port, an IEEE1394 port such as i.Link, and a SCSI (Small Computer System Interface) port. Other examples of the connection port 923 include an RS-232C port, an optical audio terminal, and an HDMI (High-Definition Multimedia Interface) port. When the externally connected device 929 is connected to this connection port 923, the information processing apparatus 10 directly obtains various data from the externally connected device 929 and provides various data to the externally connected device 929.

The communication device 925 is a communication interface constituted by, for example, a communication device for connecting to a communication network 931. The communication device 925 is, for example, a wired or wireless LAN (Local Area Network), Bluetooth, or a communication card for WUSB (Wireless USB). Alternatively, the communication device 925 may be a router for optical communication, a router for ADSL (Asymmetric Digital Subscriber Line), or a modem for various communications. This communication device 925 can transmit and receive signals and the like in accordance with a predetermined protocol such as TCP/IP with, for example, the Internet and other communication apparatuses. The communication network 931 connected to the communication device 925 is constituted by a network and the like connected via wire or connected wirelessly. For example, the communication network 931 may be the Internet, a home LAN, an infrared communication, a radio wave communication, or a satellite communication.

An example of hardware configuration capable of achieving the functions of the information processing apparatus 10 according to each embodiment of the present invention has been described hereinabove. Each of the above constituent elements may be made using a generally-used member, or may be made with hardware dedicated for the function of the constituent element. Therefore, the used hardware configuration can be changed as necessary in accordance with the technical level at the time of carrying out the present embodiment.

<Summary>

As hereinabove described, according to the information processing apparatus and the information processing method of the present embodiment, the information processing apparatus displaying various information using the plurality of display screens can present the same information as an information processing apparatus displaying various information using one display screen. The information processing apparatus according to the present embodiment does not arrange any object in the non-display region, and therefore has an advantage in that: a user can easily recognize the content of an object; an object is not divided when it is displayed; and the object is displayed as the original size of the object.

When a portion of an object resides in the non-display region, the display position of the object is corrected with the animation, so that a user can be notified that "the object may not be arranged in the connection unit."

Further, the determination criteria for the correction of the display position is changed in accordance with the size, the display position, the attribute information, and the like of the object, so that the layout of the object can be corrected without causing a user to feel stressed, and the operability can be improved.

It should be understood by those skilled in the art that various modifications, combinations, sub-combinations and alterations may occur depending on design requirements and other factors insofar as they are within the scope of the appended claims or the equivalents thereof.

For example, in the above embodiments, the information processing apparatus equipped with the two touch panels has been explained as an example, but the present invention is not limited thereto. For example, the present invention can be applied to an information processing apparatus equipped with three or more touch panels in the same manner.

The present application contains subject matter related to that disclosed in Japanese Priority Patent Application JP 2009-017204 filed in the Japan Patent Office on 28 Jan. 2009, the entire content of which is hereby incorporated by reference.

What is claimed is:

1. An information processing apparatus comprising:
an input position detection unit configured to detect a position of an operator performing one of a drag operation and a flick operation, the operator located on first and/or second display panels capable of displaying a plurality of objects, the first and second display panel connected via a connection unit serving as a non-display region in which the objects are not displayed;
a direction detection unit configured to detect a moving direction of the operator, on the basis of a time change of the detected position of the operator;
a moved position calculation unit configured to calculate a moved position to which an object selected with the operator moves, the selected object moving to the moved position along a path in which the operator moves; and
a display position correction unit configured to move the selected object from the non-display region, on the basis of a display position of the selected object or a moving direction of the operator, in a case where at least a portion of the selected object having moved to the calculated moved position resides in the non-display region,
wherein when the drag operation is performed by the operator on the selected object and at least the portion of the selected object having moved to the calculated moved position resides in the non-display region, the display position correction unit controls the selected object to be moved to one of the first and second display panels in which a barycenter of the selected object resides, on the basis of the position of the barycenter of the selected object, and
wherein when the flick operation is performed by the operator on the selected object and at least the portion of the selected object having moved to the calculated moved position resides in the non-display region, the display position correction unit controls the selected object to be moved to one of the first and second display panels in which the selected object was not displayed at the start of the flick operation.

2. The information processing apparatus according to claim 1, wherein the display position correction unit moves the selected object to one of the first and second display panels toward which the operator moves, in a case where the selected object is in proximity to the non-display region.

3. The information processing apparatus according to claim 2, wherein the display position correction unit moves the selected object to one of the first and second display panels toward which the operator moves, in a case where attribute information associated with the selected object changes when the selected object is moved from one of the first and second display panels to the other of the first and second display panels.

4. The information processing apparatus according to claim 1, wherein when the selected object is moved towards the moved position and as the selected object comes towards a stop in motion at the moved position such that at least a portion of the selected object resides in the non-display region, the display position correction unit controls the selected object to reaccelerate and spring out from the non-display region so as to be displayed fully within the first display panel or the second display panel.

5. An information processing method, comprising the steps of:
   detecting a position of an operator performing one of a drag operation and a flick operation, the operator located on first and/or second display panels capable of displaying a plurality of objects, the first and second display panel being connected with each other via a connection unit serving as a non-display region in which the objects are not displayed;
   detecting a moving direction of the operator, on the basis of a time change of the detected position of the operator;
   calculating a moved position to which an object selected with the operator moves, the selected object moving to the moved position along a path in which the operator moves; and
   moving the selected object from the non-display region, on the basis of a display position of the selected object or a moving direction of the operator, in a case where at least a portion of the selected object having moved to the calculated moved position resides in the non-display region,
   wherein when the drag operation is performed by the operator on the selected object and at least the portion of the selected object having moved to the calculated moved position resides in the non-display region, the selected object is moved from the non-display region to one of the first and second display panels in which a barycenter of the selected object resides, on the basis of the position of the barycenter of the selected object, and
   wherein when the flick operation is performed by the operator on the selected object and at least the portion of the selected object having moved to the calculated moved position resides in the non-display region, the selected object is moved to one of the first and second display panels in which the selected object was not displayed at the start of the flick operation.

6. The information processing method according to claim 5, wherein when the selected object is moved towards the moved position and as the selected object comes towards a stop in motion at the moved position such that at least a portion of the selected object resides in the non-display region, the selected object is controlled to reaccelerate and spring out from the non-display region so as to be displayed fully within the first display panel or the second display panel.

7. A non-transitory computer-readable medium embodying instructions for a computer having first and second display panels capable of displaying a plurality of objects, the first and second display panels being connected with each other via a connection unit serving as a non-display region in which the objects are not displayed, the non-transitory computer-readable medium causing the computer to perform:
   an input position detection function for detecting a position of an operator performing one of a drag operation and a flick operation, the operator located on the first and/or second display panels;
   a direction detection function for detecting a moving direction of the operator, on the basis of a time change of the detected position of the operator;
   a moved position calculation function for calculating a moved position to which an object selected with the operator moves, the selected object moving to the moved position along a path in which the operator moves; and
   a display position correction function for moving the selected object from the non-display region, on the basis of a display position of the selected object or a moving direction of the operator, in a case where at least a portion of the selected object having moved to the calculated moved position resides in the non-display region,
   wherein when the drag operation is performed by the operator on the selected object and at least the portion of the selected object having moved to the calculated moved position resides in the non-display region, the display position correction function moves the selected object to one of the first and second display panels in which a barycenter of the selected object resides, on the basis of the position of the barycenter of the selected object, and
   wherein when the flick operation is performed by the operator on the selected object and at least the portion of the selected object having moved to the calculated moved position resides in the non-display region, the display position correction function moves the selected object to one of the first and second display panels in which the selected object was not displayed at the start of the flick operation.

8. The computer-readable medium according to claim 7, wherein the computer is further caused to perform:
   wherein when the selected object is moved towards the moved position and as the selected object comes towards a stop in motion at the moved position such that at least a portion of the selected object resides in the non-display region, the display position correction unit controls the selected object to reaccelerate and spring out from the non-display region so as to be displayed fully within the first display panel or the second display panel.

* * * * *